Dec. 18, 1962
B. E. MARTEL
3,069,493
SWEEP SYNCHRONIZATION SYSTEM FOR INFRA-RED
GROUND-SCANNING DEVICES
Filed Nov. 18, 1958
2 Sheets-Sheet 1
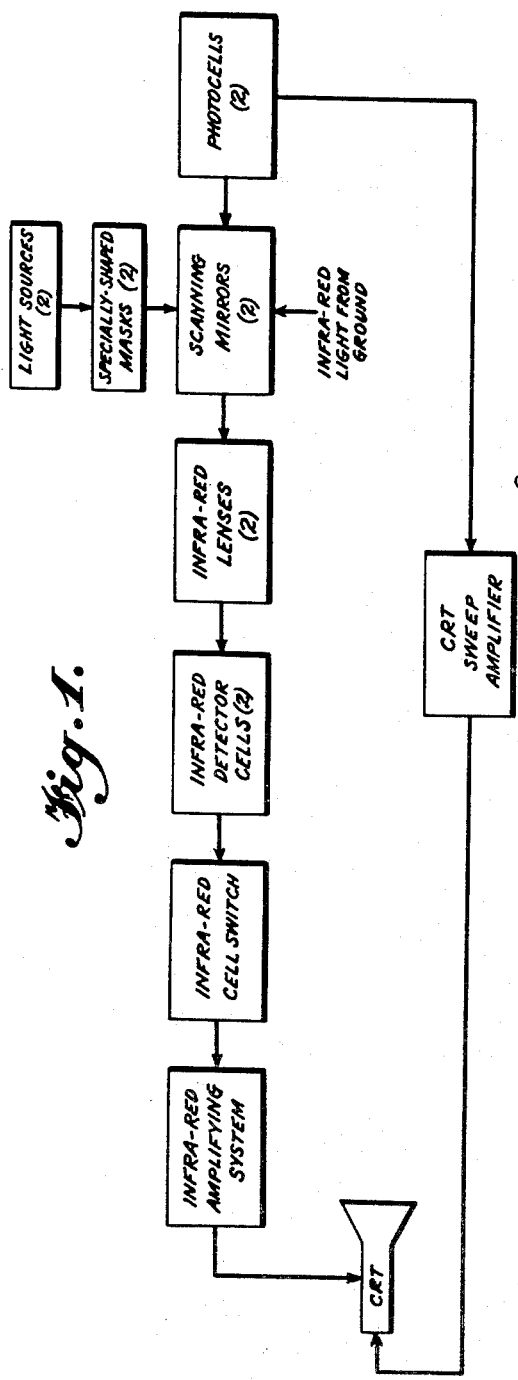
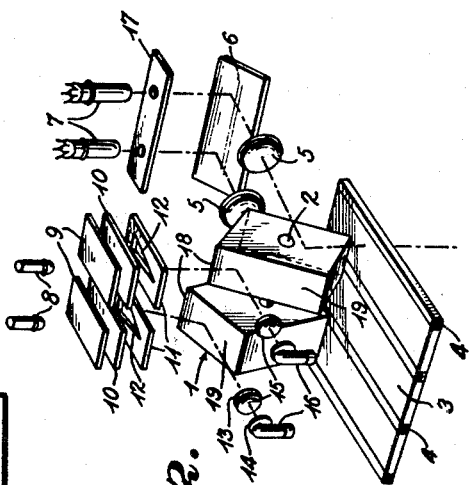
INVENTOR
*Bob E. Martel*
BY *Stevens, Davis, Miller & Mosher*
ATTORNEYS

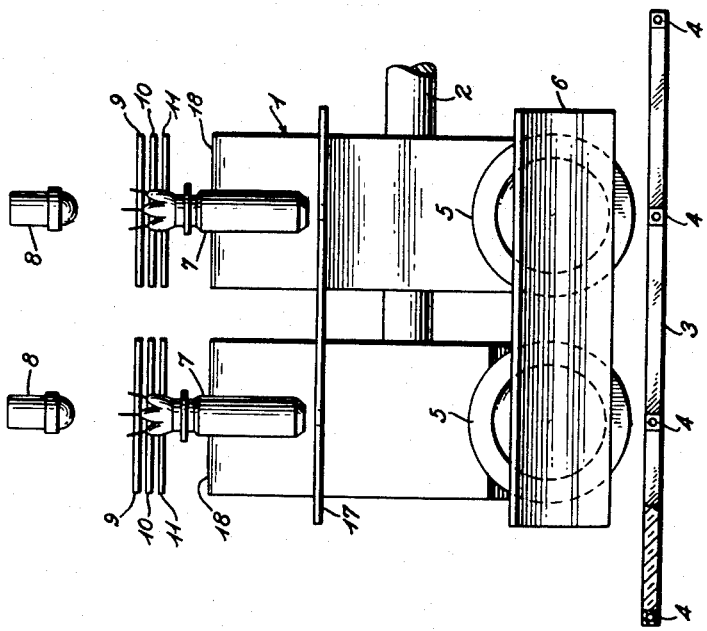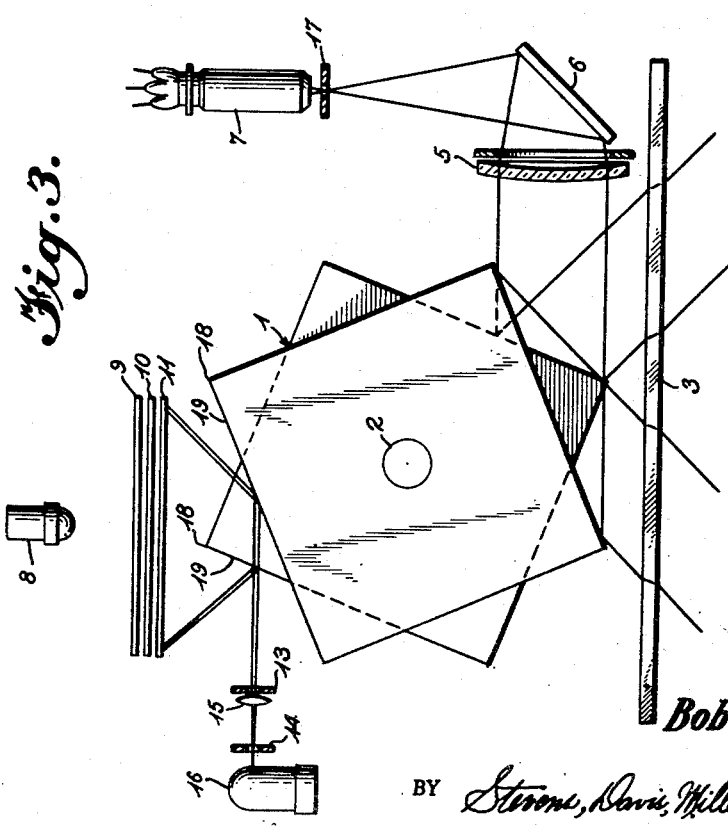

United States Patent Office

3,069,493
Patented Dec. 18, 1962

3,069,493
SWEEP SYNCHRONIZATION SYSTEM FOR INFRA-RED GROUND-SCANNING DEVICES
Bob E. Martel, Dallas, Tex., assignor to Texas Instruments Incorporated, Dallas, Tex., a corporation of Delaware
Filed Nov. 18, 1958, Ser. No. 774,779
16 Claims. (Cl. 178—6)

This invention relates to infra-red reconnaissance systems, and more specifically relates to a system for synchronizing the sweep of an image on a display media with the ground sweep of an associated scanning device.

One of the serious problems encountered in the development of reconnaissance systems adapted to scan the earth from an air-borne vehicle is that of deriving a true scale map, or ground image. This problem arises for the following reasons. Present air-borne ground-scanning systems employ revolving light-directing elements, such as mirrors or prisms, to scan the ground and direct light onto a detector. The detected light is amplified and sent to suitable display media, such as a cathode ray tube. The scan is made by starting the sweep of the light-directing element at an angle of 45° to vertical, sweeping through vertical, and ending at an angle of 45° on the opposite side of vertical. Since the scanning element revolves with approximately constant angular velocity, the actual amount of ground scanned is greater near the beginning and the end of the sweep than at the center. This is because an incremental change in the scan angle near the beginning or end of the 90° sweep corresponds to a larger transverse ground distance than the distance swept by an equivalent change in scan angle near the center of the sweep.

One way to solve this problem, and thus to reproduce a true scale map, would be to vary the angular velocity of rotation of the mirror, gradually increasing the angular velocity as it passes through the center of the sweep and then decreasing the angular velocity toward the end of the sweep. However, this would necessitate a precision variable speed drive for the scanning element, which is difficult to realize with sufficient accuracy.

The present invention offers a practical and accurate solution to this problem. According to the principles of the present invention the scanning element is driven at a variable or constant angular velocity, and the sweep for the cathode ray tube, which displays the image of the scanned ground, is speeded up near the beginning and the end of the ground sweep of the scanning element. By varying the speed of the cathode ray sweep by the proper amount, the sweep is made proportional to ground distance instead of to the angular rotation of the scanning element.

It is, therefore, a principal object of the present invention to provide a reconnaissance system in which the sweep of the cathode ray tube which displays the ground image is driven in precise synchronism with the ground sweep of the scanning element.

It is a further object of this invention to provide an infra-red reconnaissance system which will reproduce a true scale map.

It is a still further object of this invention to provide an infra-red ground-scanning device having a scanning mirror rotatable at variable or constant angular velocity and synchronizing the sweep of the image-displaying cathode ray tube with the transverse ground sweep of the scanning mirror. This device keeps the CRT Beam "In Step" with the corresponding spot on the ground being "viewed" by the mirror even though the mirror speed varies.

It is a still further object of this invention to provide an infra-red ground-scanning device for reconnaissance from an air-borne vehicle which is accurate, light, compact, rugged and durable.

In accordance with these objectives a pair of four-faced scanning mirrors are mounted for rotation on a shaft, the faces of one mirror being disposed at angles of 45° to the faces of the other mirror. As the shaft rotates, the mirrors scan the ground through a 90° arc. Infra-red waves from the ground are reflected by one of the mirrors onto an infra-red detector, such as an indium antimonide cell. The output signal from the infra-red detector is amplified and displayed on a cathode ray tube. The drive sweep for the cathode ray tube is synchronized with the transverse ground sweep of the rotating mirrors by the special system provided according to the principles of the present invention. The system is used in conjunction with the rotating scanning mirrors and requires few additional parts.

Light from a separate source is directed onto that face of one of the four-faced mirrors opposite to the face which is presently scanning the ground, and is reflected by the mirror onto a photocell. A mask, interposed between the source of light and the mirror, is specially designed to vary the amount of light reflected by the mirror according to the mirror's angular position. The amount of light falling on the photocell is thus made a function of mirror position. The output from the photocell is used to drive the sweep for the cathode ray tube, the result being that the cathode ray beam position varies as a function of the angular position of the scanning mirror.

Other and further objects and advantages of the present invention will become readily apparent from the following detailed description of a preferred embodiment of the invention when taken in conjunction with the appended drawings in which:

FIGURE 1 is a block diagram of the sweep synchronization system of the present invention;

FIGURE 2 is a perspective view of the apparatus of the invention;

FIGURE 3 is a side view of the apparatus; and

FIGURE 4 is an end view of the apparatus.

Referring now to the drawings, there will be described a preferred embodiment of the present invention and its mode of operation.

A pair of four-faced scanning mirrors 1 are mounted on shaft 2, the faces of one of the mirrors being disposed at angles of 45° to the faces of the other mirror. The shaft 2 is rotated at constant or variable angular velocity causing the mirrors 1 to scan the ground and to reflect energy from the ground through a three-sectioned silicon window 3. Coolant tubes 4 are provided between the sections of the silicon window, as well as at their ends, in order to maintain the window at suitable temperatures. A pair of silicon focusing lenses 5 are disposed slightly above the silicon window 3 and behind the four-faced mirrors 1. A single-faced mirror 6 is placed behind the silicon lenses 5, the plane of the mirror 6 forming an angle of about 45° with the plane of the silicon lenses 5. A pair of indium antimonide infra-red detector cells 7 are located above the mirrors 6, each detector cell 7 lying in the plane determined by the cell 7, one of the mirrors 1, and the associated silicon focusing lens 5.

A field-limiting mask 17 consisting of a metal disc with holes of various sizes is disposed just below the indium antimonide cells 7 at the focal point of each lens 5 in order to restrict the field of view of the cells 7 to one-half mil. By rotating the disc 17 to position a different-sized hole in the optical path, infra-red beams of various widths may be selected. When operating the scanning device it is desired to obtain the narrowest beam which gives an adequate signal under prevailing atmospheric conditions.

Infra-red energy from the ground passes through the silicon window 3, and after being reflected by one of the four-faced mirrors 1, is focused by the associated lens 5 (off of the reflecting surface of mirror 6 and through the proper aperture in the field-limiting mask 17) onto the associated detector cell 7. The output signals from the infra-red detector cells 7 are sent to an infra-red cell switch (see FIGURE 1) which selects which infra-red cell is to be used during a given time interval. Output signals from the infra-red cell switch, after being sent through an infra-red amplifying system, are displayed on a cathode ray tube.

In the operation of the scanning device the field of view from one of the lenses 5 is reflected from the associated rotating mirror 1, and scans the ground in a direction transverse to the direction of flight of the airborne vehicle. When the scan angle reaches 45° from vertical, the cell switch turns off the output signal from the infra-red detector cell presently in use, and at the same time turns on the output signal from the other infra-red detector cell. The instantaneous scan angle of the second cell is 90° behind that of the first cell so that a 90° field may be scanned continuously except for the lost time required for cell switching and cathode ray tube flyback. This loss of time actually reduces the useful scan angle to approximately 88°.

The system of the present invention serves to synchronize the cathode ray tube sweep signal with the transverse ground sweep of the rotating mirrors. In the apparatus for the system a light source 8 is positioned above each scanning mirror 1. Translucent diffusing plates 9 and 10 are disposed between the sources of light 8 and the mirrors 1. A mask 11, having an approximately triangular aperture 12, is positioned below each set of diffusing plates 9 and 10, while view-limiting apertured plates 13 and 14 are disposed to one side of the upper face of each mirror 1. A collimating lens 15 is mounted between each set of apertured plates 13 and 14, while a photocell 16 is positioned behind each plate 14. The photocell outputs are amplified and used to drive the sweep signal for the image-displaying cathode ray tube.

Light from one of the sources 8, after traversing the associated set of diffusing plates 9 and 10 and aperture 12 in mask 11, is reflected from the upper face 19 of the associated mirror 1 through the view-limiting aperture in plate 13, through collimating lens 15 and the aperture in plate 14 onto the photocell 16. The apertures in plates 13 and 14 together with collimating lens 15 restrict the field in view of the photocells 16 to a very narrow fan-shaped field.

As the mirror 1 rotates to scan the ground as previously described, the edge 18 of the upper face of the mirror 1 passes under the mask 11. The movement of the edge 18 relative to the mask 11 causes a variable amount of the area of the aperture 12 in the mask 11 to be projected onto the upper face 19 of the mirror 1. Since the amount of light reaching the photocell 16 is determined by the amount of light reflected by the face 19 of the scanning mirror 1, the amount of light falling on the photocell 16 is thus a function of the angular position of the mirror 1. The timing and waveshape of the cathode ray sweep is, in turn, controlled by the amount of light impinging upon the photocell 16. Hence a cathode ray tube sweep signal is produced according to the angular position of the scanning mirror 1. This ensures proper synchronization of the image sweep with the ground scan and enables a true scale map to be reproduced whether or not the mirror rotation is held constant.

Although the present invention has been shown and described with reference to a particular embodiment, nevertheless various changes and modifications obvious to one skilled in the art are within the spirit, scope and contemplation of the invention.

What is claimed is:

1. A scanning device comprising a movable energy-directing element, means for detecting energy scanned by said element, means for displaying an image derived from said energy, means for coordinating the displayed image with the movement of said energy-directing element, and means for selectively varying the coordination between the displayed image and the movement of said energy-directing element during the formation of said image.

2. A scanning device as set forth in claim 1 wherein said means for varying the coordination comprises a light source and a photoelectric device positioned to receive light from said source reflected by said energy-directing element, said photoelectric device controlling the coordination between the displayed image and the movement of said energy-directing element, and masking means interposed between said source of light and said energy-directing element to vary the amount of light transmitted from said source which impinges upon said photoelectric device in accordance with the movement of said energy-directing element.

3. A scanning device as set forth in claim 2 wherein said masking means comprises an apertured plate, said aperture having non-parallel sides.

4. A scanning device as set forth in claim 2 wherein said masking means comprises an apertured plate, said aperture having an approximately triangular shape.

5. A scanning device as set forth in claim 2 wherein said masking means is a photographic plate.

6. A scanning device comprising a movable energy-directing element movable in an arcuate path, means for detecting energy scanned by said element, a cathode ray tube for displaying an image derived from said energy, sweep drive means for said cathode ray tube, means for coordinating the sweep of said cathode ray tube with the movement of said energy-directing element relative to the ground, and means for selectively varying the sweep rate of said cathode ray tube during the formation of said image.

7. A scanning device as set forth in claim 6 wherein said means for varying the sweep rate of said cathode ray tube comprises a light source and a photoelectric device positioned to receive light transmitted from said source and reflected by said energy-directing element, said photoelectric device being connected to said sweep drive means for said cathode ray tube, and shaped masking means interposed between said source of light and said energy-directing element to vary the amount of light transmitted from said source which impinges upon said photoelectric device in accordance with the movement of said energy-directing element.

8. A scanning device as set forth in claim 7 wherein said masking means defines an area transparent to light.

9. A scanning device as set forth in claim 7 wherein said masking means comprises an apertured plate, said aperture having non-parallel sides.

10. A scanning device as defined in claim 7 wherein said masking means is shaped to compensate for optical errors and for non-linearity of the cathode ray tube sweep drive means.

11. A scanning device comprising a rotatable mirror movable in an arcuate path, means for detecting energy scanned by said mirror, a cathode ray tube for displaying an image derived from said energy, sweep drive means for said cathode ray tube, means for coordinating the sweep of said cathode ray tube with the movement of said rotatable mirror, and means for selectively varying the sweep rate of said cathode ray tube during the formation of said image.

12. A scanning device as set forth in claim 11 wherein said means for varying the sweep rate of said cathode ray tube comprises a light source and a photoelectric device positioned to receive light transmitted from said source and reflected by said rotatable mirror, said photoelectric device being connected to said sweep drive means for said cathode ray tube, and shaped masking means interposed between said source of light and said rotatable mirror to vary the amount of light transmitted from said source which impinges upon said photoelectric device in accordance with the movement of said rotatable mirror.

13. A scanning device as set forth in claim 12 wherein said masking means comprises an apertured plate, said aperture having non-parallel sides.

14. A scanning device as set forth in claim 12 wherein said masking means comprises an apertured plate, said aperture having an approximately triangular shape.

15. A scanning device as set forth in claim 11 wherein said means for detecting energy is infra-red responsive.

16. A scanning device comprising a movable energy-directing element, means for detecting energy scanned by said element, means for displaying an image derived from said energy, means for coordinating the displayed image with the movement of said energy-directing element, and means for selectively varying the coordination between the displayed image and the movement of said energy-directing element during the formation of said image as a function of the movement of said energy-directing element, said movable energy-directing element cooperating as a part of said means for selectively varying the coordination in the generation of said functional relationship between the display of said image and the movement of said energy-directing element.

References Cited in the file of this patent

UNITED STATES PATENTS

| | | |
|---|---|---|
| 2,419,024 | Iams | Apr. 15, 1947 |
| 2,524,987 | Mesa | Oct. 10, 1950 |
| 2,844,648 | Rosenthal | July 22, 1958 |
| 2,859,652 | Hopgood | Nov. 11, 1958 |
| 2,859,653 | Blackstone et al. | Nov. 11, 1958 |
| 2,860,179 | Blackstone | Nov. 11, 1958 |
| 2,878,711 | Blackstone | Mar. 24, 1959 |
| 2,878,712 | Blackstone et al. | Mar. 24, 1959 |

FOREIGN PATENTS

| | | |
|---|---|---|
| 301,274 | France | May 16, 1936 |